US007313067B2

(12) United States Patent
Higashiyama

(10) Patent No.: US 7,313,067 B2
(45) Date of Patent: Dec. 25, 2007

(54) RECORDING-MEDIUM IDENTIFICATION DEVICE AND METHOD USING LIGHT SENSOR TO DETECT RECORDING MEDIUM TYPE

(75) Inventor: Taku Higashiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 10/693,890

(22) Filed: Oct. 28, 2003

(65) Prior Publication Data

US 2004/0257942 A1 Dec. 23, 2004

(30) Foreign Application Priority Data

Oct. 29, 2002 (JP) ............................ 2002-314605
Oct. 10, 2003 (JP) ............................ 2003-352289

(51) Int. Cl.
*G11B 7/00* (2006.01)
*B41J 2/01* (2006.01)

(52) U.S. Cl. ...................................... 369/53.2; 347/105

(58) Field of Classification Search ................ 347/105; 369/53.2

See application file for complete search history.

(56) References Cited

U.S. PATENT DOCUMENTS 3,435,240 A * 3/1969 Brunton ................. 250/559.01
5,003,521 A * 3/1991 Yoshida et al. .......... 369/44.25
5,139,339 A * 8/1992 Courtney et al. ........... 356/446
6,291,829 B1 * 9/2001 Allen et al. ............ 250/559.07
6,561,643 B1 * 5/2003 Walker et al. .............. 347/105
6,659,578 B2 * 12/2003 Gudaitis et al. ............... 347/3
6,735,207 B1 * 5/2004 Prasad et al. ............ 370/395.7
6,914,684 B1 * 7/2005 Bolash et al. ............... 356/600
6,984,034 B2 * 1/2006 Tsujimoto .................... 347/105

FOREIGN PATENT DOCUMENTS

JP 8-188322 7/1996
JP 10-198093 7/1998

* cited by examiner

*Primary Examiner*—Thang V. Tran
(74) *Attorney, Agent, or Firm*—Fitzpatrick, Cella, Harper & Scinto

(57) ABSTRACT

A recording-medium identification device has a light-emitting element for applying light on the recording medium and a detection element for detecting diffusely reflected light reflected in a backward direction, that is, a direction opposite to the direction in which the applied light is made incident, the diffusely reflected light being part of the applied light that is scattered and reflected on the recording medium.

16 Claims, 12 Drawing Sheets

RECORDING-MEDIUM IDENTIFICATION DEVICE AND METHOD USING LIGHT SENSOR TO DETECT RECORDING MEDIUM TYPE

BACKGROUND OF THE INVENTION

1. Field of the Invention

The present invention relates to a recording-medium identification device for identifying the type of recording medium fed by analyzing the optical characteristic thereof.

2. Description of the Related Art

Hitherto, various kinds of recording devices such as copiers, facsimile machines, printers, and so forth, have been used to perform printing on recording mediums such as sheets of paper, plastic sheets for an overhead projector (hereinafter referred to as an OHP sheet), and so forth. These recording devices can establish the best printing mode according to the type of recording mediums. For example, an ink-jet printer can change its ink-jetting mode so as to form a suitable image according to the type of recording medium, such as a plain-paper sheet, a high-quality-paper sheet, the OHP sheet, and so forth. In the past, a user of the recording device usually would manually set the type of a recording medium. However, when the user performs the setting improperly or neglects to perform the setting because of its complex procedures, it is impossible for the user to perform printing properly according to the type of the recording medium. Therefore, for solving the above-described problems, techniques for adding a recording-medium identification device to identify the type of recording medium for the recording device have been introduced.

For example, the following two methods are among those which have been introduced to identify the type of recording medium. According to a first method, the type of a recording medium is identified by measuring the thickness of the recording medium. According to a second method, the type of a recording medium is identified by reflecting light off the print surface of the recording medium and observing the reflected light to identify the type of recording medium.

Japanese Patent Laid-Open No. 8-188322 discloses the above-described first method. According to this method, however, the print-surface condition of the recording medium cannot be measured directly. Therefore, it has been difficult to identify the print-surface condition with precision and determine the type of the recording medium.

Japanese Patent Laid-Open No. 10-198093 discloses the above-described second method. In this method, a light-emitting element and a reflected-light-receiving element are provided adjacent the print surface of the recording medium. The light applied on the recording medium is reflected by the print surface thereof, whereby the type of the recording medium is identified. In this case, the print-surface condition can be determined directly. However, it is difficult to determine the print-surface condition with precision using only two parameters, that is, the specularly reflected light and the diffusely reflected light that are observed. This problem occurs in the case where specularly reflected light and diffusely reflected light obtained by a first recording medium and those obtained by a second recording medium, the second recording medium being different from the first recording medium in type, are similar to one another.

Recording media such as the high-quality-paper sheets and the plain-paper sheets other than OHP or coated-paper sheets produce a small amount of specularly reflected light. Since it is difficult to differentiate between the high-quality-paper sheet and the plain-paper sheet according to the intensity and amount of diffusely reflected light obtained by these two paper-sheets, the differentiation is often performed improperly. Thus, it has been difficult to identify with precision the type of a recording medium according to the above-described methods.

SUMMARY OF THE INVENTION

It is an object of the present invention is to provide a recording-medium identification device for identifying various types of recording media with precision and stability.

According to an aspect of the present invention, there is provided a recording-medium identification device for identifying a recording medium type. The recording-medium identification device comprises a light emitting unit for reflecting light off a surface of the recording medium, the light emitting unit applying light on the surface in a predetermined direction other than a direction normal to the surface, a detection unit for detecting an amount of light reflected in a backward direction of the light emitted by the light emitting unit, and an identification unit for identifying the type of the recording medium based on the amount of light detected by the detection unit.

Preferably, the detection unit further comprises a specularly-reflected-light detection unit for detecting the amount of specularly reflected light of the light reflected off the surface of the recording medium. Therefore, it becomes possible to identify the recording medium type with precision higher than that in the past.

Preferably, the detection unit further comprises a diffusely-reflected-light-detection unit for detecting an amount of diffusely reflected light of the light reflected off the surface of the recording medium. The diffusely reflected light is reflected at a predetermined angle other than the angle at which the light applied by the light emitting unit is made incident. Therefore, it becomes possible to identify the recording medium type with precision higher than that in the past.

The light emitting unit may preferably be a laser light. Accordingly, it becomes possible to emit lights that travel in straight lines and that are of the same wavelength and in the same phase and make diffusely reflected lights interfere with one another.

Preferably, the detection unit includes a semiconductor light receiving element for detecting the amount of received light reflected off the surface of the recording medium. Accordingly, it becomes possible to convert the received light into an electrical signal and measure the electrical signal.

The recording-medium identification device may further comprise a reflector positioned between the light emitting unit and the recording medium to reflect in a predetermined direction light reflected off the surface of the recording medium.

According to the present invention, therefore, it becomes possible to correctly identify the type of a recording medium by measuring the diffusely reflected light reflected by the recording medium into a backward direction, that is, a direction opposite to the direction in which the applied light is made incident. This diffusely reflected light is referred to as coherent backscattering of light.

Preferably, the reflector is a half mirror.

According to another aspect of the present invention, there is provided a recording-medium identification device for identifying a recording medium type. The recording medium identification device comprises a light emitting unit for reflecting light off a surface of the recording medium.

This light emitting unit is positioned to direct light onto the surface of the recording medium in a predetermined direction other than a direction normal to the surface of the recording medium. The recording medium identification device further comprises a specularly-reflected-light receiving element provided at a predetermined position so as to receive specularly reflected light at a predetermined angle the same as that at which the light emitted from the light emitting unit was made incident, a half mirror positioned between the light emitting unit and the recording medium to reflect light in a direction generally perpendicular to the direction of the light emitted from the light emitting unit, a coherent-backscattering-of-light receiving element for receiving light reflected from the half mirror, and an identification unit for identifying the type of recording medium based on the amount of light detected by the specularly-reflected-light receiving element and the coherent-backscattering-of-light receiving element.

Preferably, the half mirror and the coherent-backscattering-of-light receiving element are combined and movable in unison.

Preferably, the light emitting unit is movable.

Preferably, the recording-medium identification device further comprises a diffusely-reflected-light receiving element provided at a position so as to receive diffusely reflected light reflected at a predetermined angle other than the angle at which the light emitted from the light emitting unit is made incident. The identification unit may also base the identification of the type of recording medium on an amount of light detected by the diffusely-reflected-light receiving element.

According to another aspect of the present invention, there is provided a recording-medium identification device for identifying a recording medium type. The recording medium identification device comprises a light emitting unit for reflecting light off a surface of the recording medium. This light emitting unit is positioned to direct light onto the surface of the recording medium in a predetermined direction other than a direction normal to the surface of the recording medium. The recording medium identification device further comprises a specularly-reflected-light receiving element provided at a predetermined position so as to receive specularly reflected light at a predetermined angle the same as that at which the light emitted from the light emitting unit was made incident, a half mirror positioned between the light emitting unit and the recording medium to reflect light in a direction generally perpendicular to the direction of the light emitted from the light emitting unit, and a movable coherent-backscattering-of-light receiving element for receiving light reflected from the half mirror. The coherent-backscattering-of-light receiving element is movable between a position where it receives light reflected from the half mirror and a position where it receives diffusely reflected light reflected at a predetermined angle other than the angle at which light emitted from the light emitting unit is made incident. The recording medium identification device further comprises an identification unit for identifying the type of recording medium based on an amount of light detected by the specularly-reflected-light receiving element and an amount of light detected by the coherent-backscattering-of-light receiving element at the end of the two positions.

According to another aspect of the present invention, there is provided a recording-medium identification device for identifying a recording medium type. This recording-medium identification device comprises a light emitting unit for reflecting light off a surface of the recording medium. This light emitting unit applies light on the surface in a predetermined direction other than a direction normal to the surface of the recording medium. The recording-medium identification device further comprises a half-mirror positioned between the light emitting unit and the recording medium to reflect light in a direction generally perpendicular to the direction of the light emitted from the light emitting unit and a single light receiving element. This light receiving element is movable between a first position where the light receiving element receives specularly reflected light reflected off the recording medium, a second position where the light receiving element receives diffusely reflected light reflected off the recording medium, and a third position where the light receiving element receives coherent backscattering of light reflected off the half mirror. The recording-medium identification device further comprises an identification unit for identifying the type of recording medium based on respective outputs of an amount of light detected by the light receiving element at the first position, the second position and the third position.

According to another aspect of the present invention, there is provided a recording-medium identification method for identifying a recording medium type using a recording-medium identification device comprising a light emitting unit for reflecting light off a surface of the recording medium, the light-emitting unit applying light on the surface in a predetermined direction other than a direction normal to the surface. The recording-medium identification method comprises the steps of detecting an amount of light reflected in a backward direction of the light emitted by the light emitting unit and identifying the type of the recording medium based on the amount of light detected in the step of detecting an amount of light.

Preferably, in the step of detecting an amount of light, an amount of light specularly reflected off the surface of the recording medium is further detected.

Preferably, in the step of detecting an amount of light, an amount of light diffusely reflected off the surface of the recording medium at a predetermined angle other than the angle at which the light applied by the light emitting unit is made incident is further detected.

As has been described, according to the present invention, it becomes possible to receive the specularly reflected light, the coherent backscattering of light, and the diffusely reflected light that are generated by light applied on a recording medium by a laser-light source and compare these specularly reflected light, coherent backscattering of light, and diffusely reflected light to stored identification reference so as to identify the recording medium type with precision higher than that in the past.

Further objects, features and advantages of the present invention will become apparent from the following description of the preferred embodiments (with reference to the attached drawings).

DESCRIPTION OF THE PREFERRED EMBODIMENTS

Preferred embodiments of the present invention will now be described with reference to the attached drawings.

First Embodiment

Figure 1:
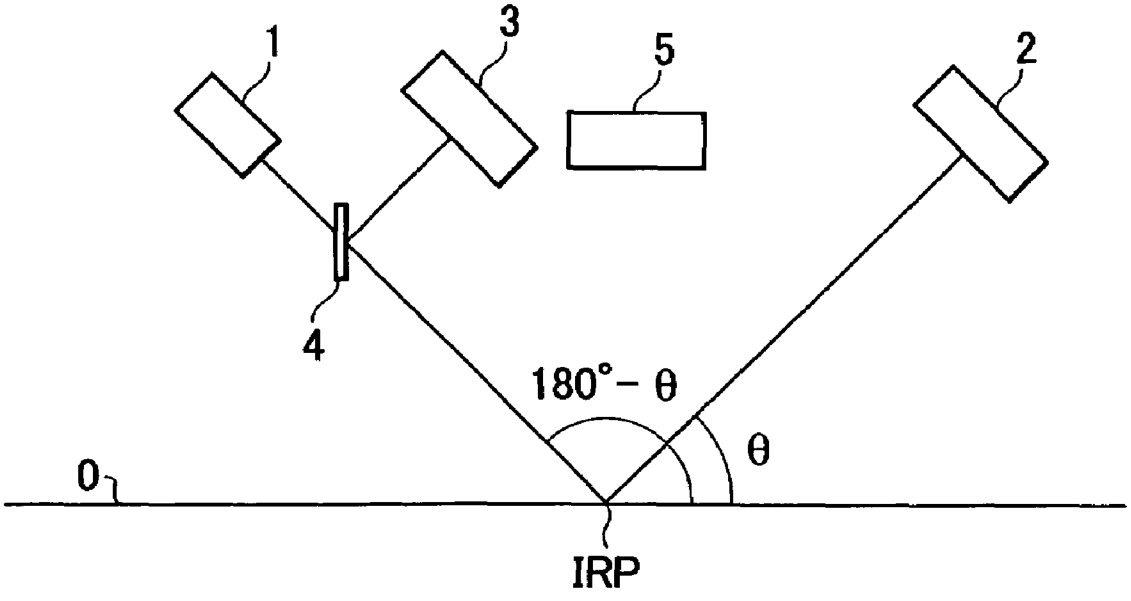
FIG. 1 schematically shows the arrangement of elements of a recording-medium identification device according to a first embodiment of the present invention.
Figure 2:
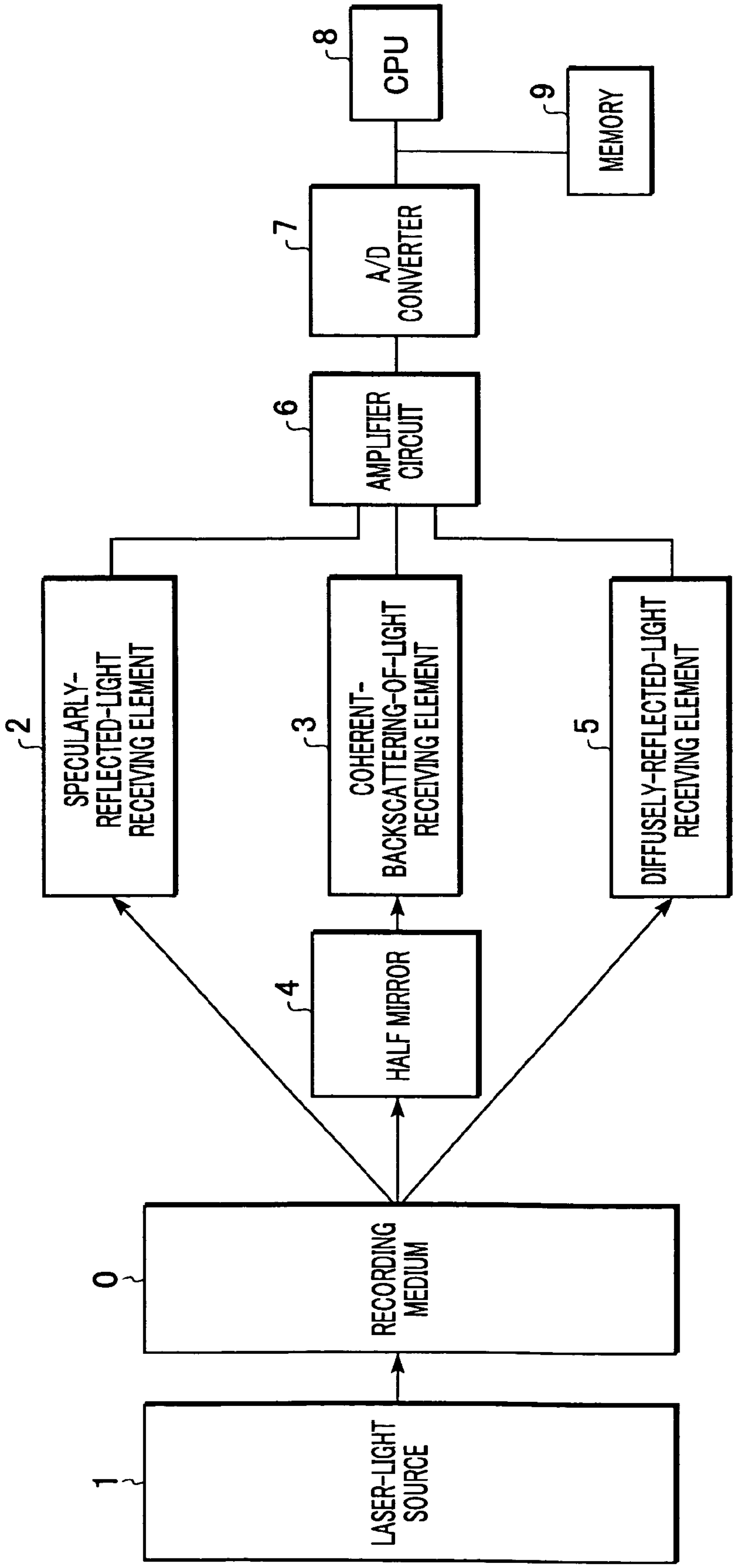
FIG. 2 is a block diagram illustrating how the elements of the recording-medium identification device according to the first embodiment are controlled.

FIG. 1 schematically shows the arrangement of the elements of a recording-medium identification device according to a first embodiment of the present invention. FIG. 2 is a block diagram illustrating how the elements of the recording-medium identification device are controlled.

As shown in FIG. 1, the recording-medium identification device has a laser-light source 1 for applying light on a recording medium 0. The recording-medium identification device further has a specularly-reflected-light-receiving element 2, a coherent-backscattering-of-light-receiving element 3, and a diffusely-reflected-light-receiving element 5. These light-receiving elements detect the light that is emitted from the laser-light source 1 and reflected off the surface of the recording medium 0. The recording-medium identification device further has a half mirror 4. In this embodiment, the laser-light source 1 is provided so as to face the recording medium at a predetermined angle other than the angle normal to the surface of the recording medium 0. The specularly-reflected-light receiving element 2 is provided at a predetermined position so as to receive specularly reflected light, that is, the light reflected at a predetermined angle that is the same as that at which the light emitted from the laser-light source 1 is made incident. The coherent-backscattering-of-light-receiving element 3 is provided at a predetermined position so as to receive light reflected in a direction backward to the direction in which the light emitted from the laser-light source 1 is made incident. That is to say, the coherent-backscattering-of-light-receiving element 3 receives the light reflected in the backward direction. The diffusely-reflected-light receiving element 5 is provided at a predetermined position so as to receive scattered light (sometimes referred to as diffusely reflected light) reflected at a predetermined angle other than the angle at which the light emitted from the laser-light source 1 is made incident. The half mirror 4 performs separation between the light emitted from the laser-light source 1 and the coherent backscattering of light reflected by the surface of the recording medium 0. In this embodiment, the half mirror 4 is positioned between the laser-light source 1 and the recording medium 0 so as to reflect light reflected off the surface of the recording medium 0 in a generally perpendicular direction.

A predetermined position on the surface of the recording medium 0 is determined to be an irradiation-reference position IRP. Then, the laser-light source 1 is provided in a predetermined position at a $180°-\theta$ angle with respect to the irradiation-reference position IRP ($0°<\theta<90°$). The specularly-reflected-light-receiving element 2 is provided at a predetermined position at a $\theta$ angle with respect to the irradiation-reference position IRP. The half mirror 4 is provided at a predetermined position on an optical path between the laser-light source 1 and the irradiation-reference position IRP on the recording medium 0 so as to reflect coherent backscattering of light from the irradiation-reference position IRP. The light emitted from the laser-light source 1 is made incident through the optical path. The coherent-backscattering-of-light-receiving element 3 is provided at a predetermined position so as to receive the coherent backscattering of light reflected by the half mirror 4. The diffusely-reflected-light-receiving element 5 is provided at a predetermined position other than the positions in which the specularly-reflected-light receiving element 2 and the coherent-backscattering-of-light-receiving element are provided. These light-receiving elements (photo sensors) can be formed of various kinds of photo diodes such as PIN-photo diodes, an avalanche-photo diode, and so forth.

The coherent backscattering of light will now be described as below.

In the case where laser light is used as the light that is made incident so as to be applied to the print surface of the recording medium 0 and predetermined conditions are satisfied, interference may occur among the diffusely reflected light of coherent components. When the diffusely reflected light of one of the coherent components and the diffusely reflected light of another propagate in the same optical path, they reach an observation surface in the same phase, for they propagate the same distance. In this case, the diffusely reflected light and the other diffusely reflected light interfere with each other so that the combined intensity increases. This increase corresponds to a coherent-backscattering phenomenon. In this case, the intensity of the diffusely reflected light observed in a direction in which the incident light goes back, that is, the backward direction, is twice as high as the intensity of diffusely reflected light of isotropic scattered components. The isotropic scattered components are normal scattered components that are reflected at angles other than that at which the light emitted from the laser-light source 1 is made incident. In this case, the observed intensity of the diffusely reflected light is the sum of the isotropic scattered components and the coherent components. Therefore, the peak of the intensity distribution points in the backward direction (refer to FIG. 11).

Figure 11:
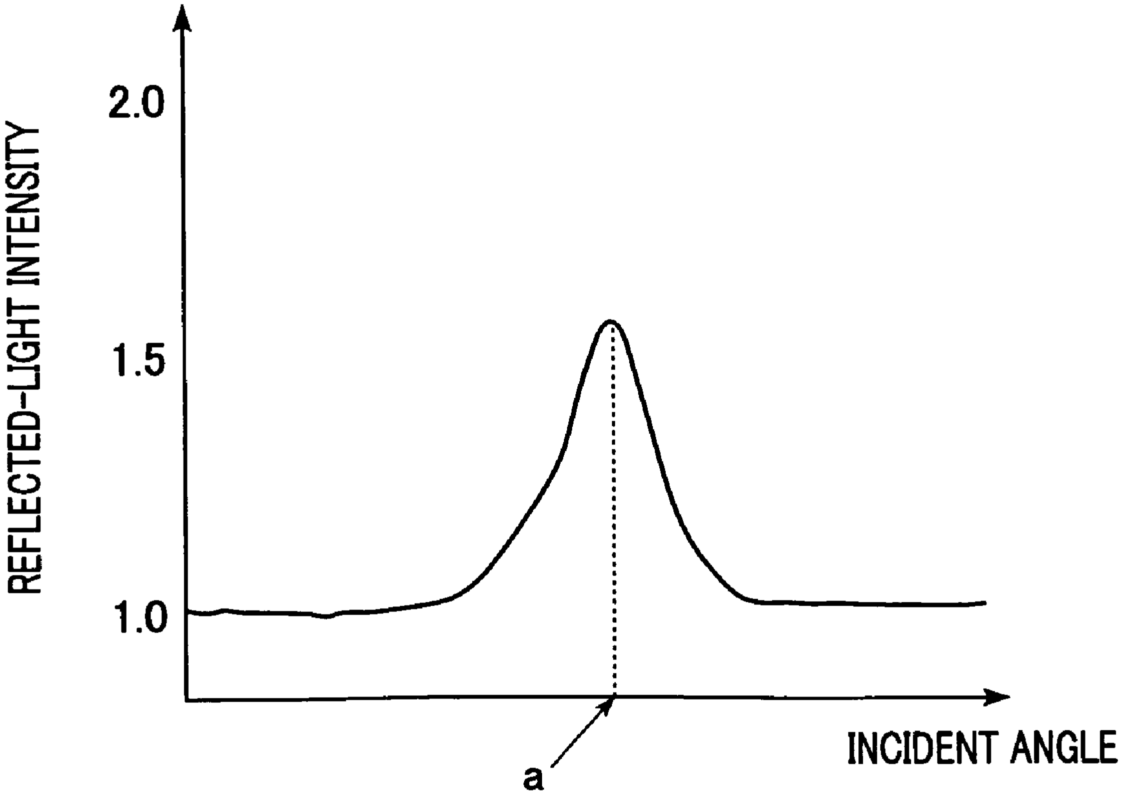
FIG. 11 shows the difference between the output value of the coherent backscattering of light and that of the diffusely reflected light.

FIG. 11 shows the difference between the intensity of the coherent backscattering of light and that of the diffusely reflected light. In this case, the positions of the light-receiving elements are fixed, the amount of emitted light is fixed, and the position of the light-emitting element is changed. The angle at which the emitted light is made incident is shown along the horizontal axis and the output values of the light-receiving elements, the output values corresponding to the angles at which light is made incident, respectively, are shown along the vertical axis. At point a shown in this drawing, the light-receiving element receives light reflected in a direction opposite to the direction at which the light is made incident, that is, the reflected light of a coherent-backscattering-of-light component. This drawing indicates that the amount of reflected light of the coherent-backscattering-of-light component is larger than that of the scattered components even though the amount of light emitted from the light-emitting element is fixed.

The intensity of the coherent backscattering of light is changed according to the configuration of dispersed particles on a reflection surface. In this case, the reflection surface is the surface of the recording medium. Since the coherent backscattering of light from the recording medium includes the information about the recording medium, it becomes possible to determine the type of the recording medium based on that information. In particular, when the recording medium is neither an OHP sheet nor a sheet of glossy paper, but a sheet of high-quality paper or a sheet of plain paper, the type of the recording medium can be efficiently identified by using the coherent backscattering of light. That is to say, even though it is not possible to determine the size and material of an anisotropic particle by using the coherent backscattering of light, it is possible to observe coherent backscattering of light that is unique to the anisotropic particle. This embodiment can be used for differentiating between the high-quality paper having particles of silica or the like applied on its surface and the plain paper including fibers such as cellulose, the high-quality paper and the plain paper being part of a recording medium that generates a small amount of specularly reflected light. That is to say, it becomes possible to observe coherent backscattering of light unique to the high-quality paper having particles of diameters that are relatively the same with one another and another coherent backscattering of light unique to the plain paper having the anisotropic particles, respectively. Since it has been difficult to identify such recording mediums by using the normal diffusely reflected light, the difference between the high-quality paper and the plain paper is used for differentiating between recording mediums generating a small amount of specularly reflected light. Coherent laser light is used as the light emitted from the light-emitting element for causing the coherent-backscattering phenomenon.

In FIG. 1, the light emitted from the laser-light source 1 reaches the recording medium 0 and is reflected and diffusely reflected according to the condition of the surface of the recording medium 0. In the case where a glossy recording medium such as an OHP sheet is used, a large amount of specularly reflected light and a small amount of diffusely reflected light will be observed. However, in the case where the recording medium has a surface that is coarse, such as a sheet of plain paper, most of the light emitted from the laser-light source 1 is diffusely reflected and only a small amount of the light is specularly reflected. The diffusely reflected light and the reflected light are received by the specularly-reflected-light-receiving element 2, the coherent-backscattering-of-light-receiving element 3, and the diffusely-reflected-light-receiving element 5, as shown in FIG. 2. Output signals from these light-receiving elements are amplified by an amplifier circuit 6, and an output from the amplifier circuit 6 is digitized by an A/D converter 7 and input to a CPU 8. A memory 9 has a program for comparing the output signals transmitted from the specularly-reflected-light-receiving element 2, the coherent-backscattering-of-light-receiving element 3, and the diffusely-reflected-light-receiving element 5 to the CPU 8 to output signals that had already been obtained for various types of recording mediums. Therefore, the CPU 8 can identify the types of the recording mediums by using these three types of output signals from the three light-receiving elements. If the strength of the output signal transmitted from the diffusely-reflected-light-receiving element 5 to the CPU 8 is low, the output signal may be amplified by the amplifier circuit 6, for example.

Figure 12A:
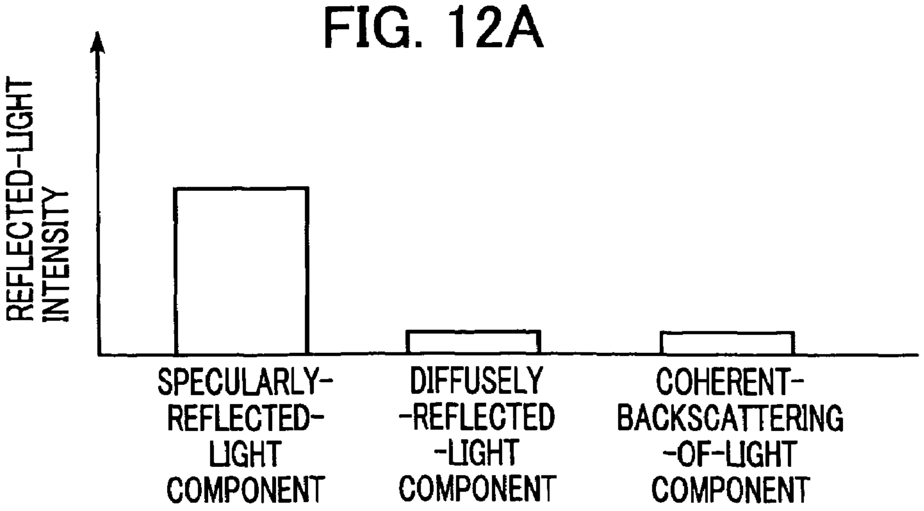
FIG. 12A shows the values of output signals transmitted from light-receiving elements according to the first embodiment, the output signals being transmitted for a recording medium, that is, an OHP sheet.
Figure 12B:
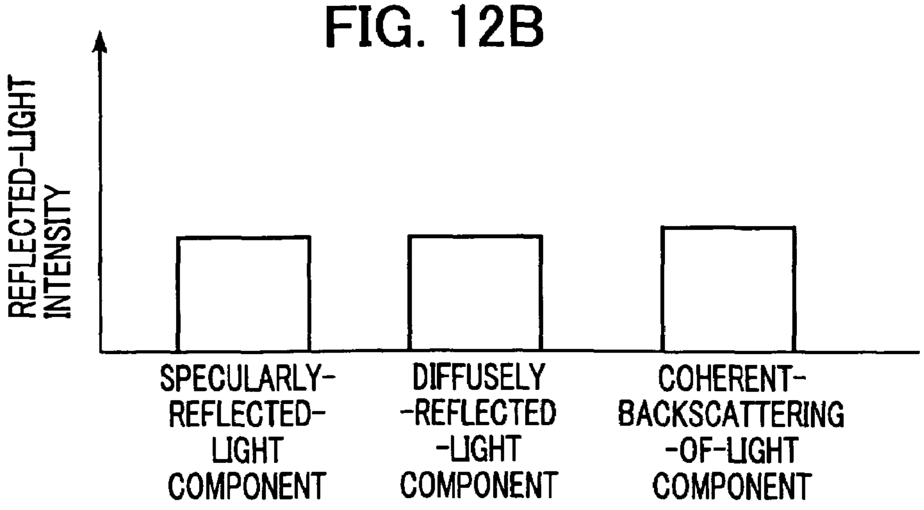
FIG. 12B shows the values of output signals transmitted from the light-receiving elements according to the first embodiment, the output signals being transmitted for another recording medium, that is, a plain-paper sheet.
Figure 12C:
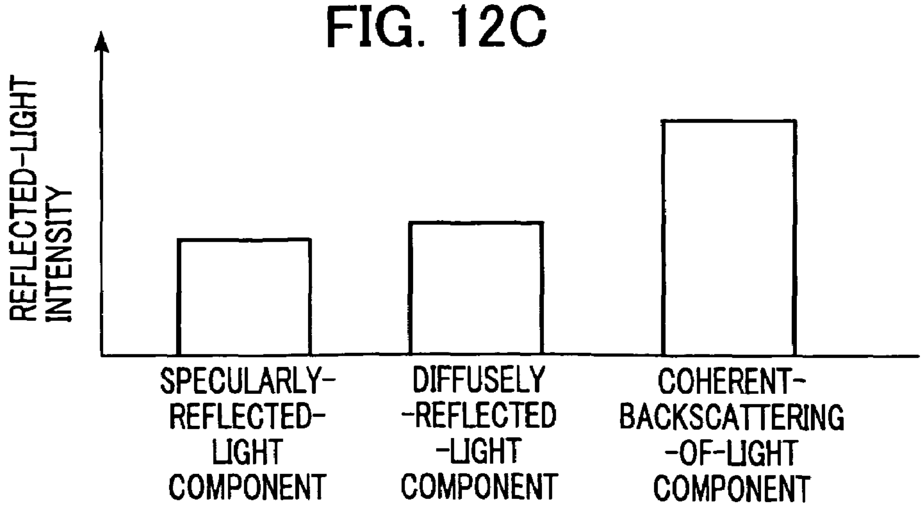
FIG. 12C shows the values of output signals transmitted from the light-receiving elements according to the first embodiment, the output signals being transmitted for another recording medium, that is, a coated-paper sheet.

FIGS. 12A, 12B, and 12C show the values of the output signals transmitted from the three light-receiving elements, the output signals being transmitted for the recording media including, respectively, an OHP sheet, a plain-paper sheet, and a coated-paper sheet.

FIG. 12A shows the values of outputs transmitted from the receiving elements 2, 3, and 5 in the case where light is applied on the OHP sheet. In this case, even though the intensity of specularly reflected light is high, the intensity of diffusely reflected light and that of coherent backscattering of light are low. This is because the smoothness of the OHP sheet's surface is high and most of light emitted from the light-emitting element is specularly reflected. Therefore, when the values of the outputs from the light-receiving elements 2, 3, and 5 are observed as in FIG. 12A, the recording medium is determined to be the OHP sheet.

FIG. 12B shows the values of the outputs transmitted from the receiving elements 2, 3, and 5 in the case where light is applied on the plain-paper sheet. In this case, the intensity of specularly reflected light, of diffusely reflected light, and of coherent backscattering of light are almost the same as each other. Since plain paper includes random fibers, the smoothness of the plain paper's surface is not high. Therefore, the diffusely reflected light becomes more dominant than the specularly reflected light. However, since the specularly-reflected-light-receiving element 2 detects some of the diffusely reflected light, the intensity of the specularly reflected light and that of the diffusely reflected light become almost the same as each other, as shown in FIG. 12B. As for the coherent backscattering of light, the intensity thereof is almost the same as that of the diffusely reflected light due to the fibers included in the surface of the plain-paper sheet. Therefore, when the values of outputs from the light-receiving elements 2, 3, and 5 are observed as in FIG. 12B, the recording medium is determined to be the plain-paper sheet.

FIG. 12C shows the values of outputs transmitted from the receiving elements 2, 3, and 5 in the case where light is applied on the coated-paper sheet. In this case, the intensity of specularly reflected light and that of diffusely reflected light are almost the same as each other. However, the intensity of coherent backscattering of light is higher than that of the diffusely reflected light. Since particles of the same diameter, for example, particles of alumina or the like are applied on the surface of the coated-paper sheet, the intensity of diffusely reflected light of the coated-paper sheet becomes higher than the intensity of diffusely reflected light of the plain-paper sheet. The intensity of coherent backscattering of light of the coated-paper sheet becomes twice as high as that of the diffusely reflected light thereof. Therefore, when the values of outputs from the light-receiving elements 2, 3, and 5 are observed as in FIG. 12C, the recording medium is determined to be the coated-paper sheet.

As has been described, the light-receiving elements 2, 3, and 5 detect the intensity of reflected light, the light having been emitted from the light-emitting element, for determining the type of a recording medium. More specifically, one of the light-receiving elements detects the intensity of coherent backscattering of light, which is reflected in a direction opposite to the direction in which light is made incident, that is, a backward direction. The other light-receiving elements detect the intensity of specularly reflected light and that of diffusely reflected light, respectively. Subsequently, the type of recording medium can be identified according to the detected values of the intensity of the specularly reflected light, the diffusely reflected light, and the coherent backscattering of light. Therefore, it becomes possible to identify the types of recording mediums with precision.

In this embodiment, the types of recording mediums are identified according to the intensity of three types of components, that is, a specularly-reflected-light component, a diffusely-reflected-light component, and a coherent-backscattering-of-light component. However, if the type of recording medium can be identified according to two types of light components, for example, the specularly-reflected-light component and the coherent-backscattering-of-light component, or the diffusely-reflected-light component and the coherent-backscattering-of-light component, the recording-medium identification device may be configured so as to detect the intensity of only two light components. Further, in the case where the type of recording medium can be identified according to the intensity of the coherent-backscattering-of-light component alone, the recording-medium identification device may be configured so as to detect the intensity of the coherent-backscattering-of-light component alone.

Further, in this embodiment, the types of the recording medium have been identified to include the OHP sheet, the plain-paper sheet, and the coated-paper sheet. However, the types of recording medium which may be identified are not limited to these three recording mediums. If the information of other types of recording mediums had already been stored in a recording device such as the memory 9, it becomes possible to identify various types of recording mediums.

Second Embodiment

Figure 3:
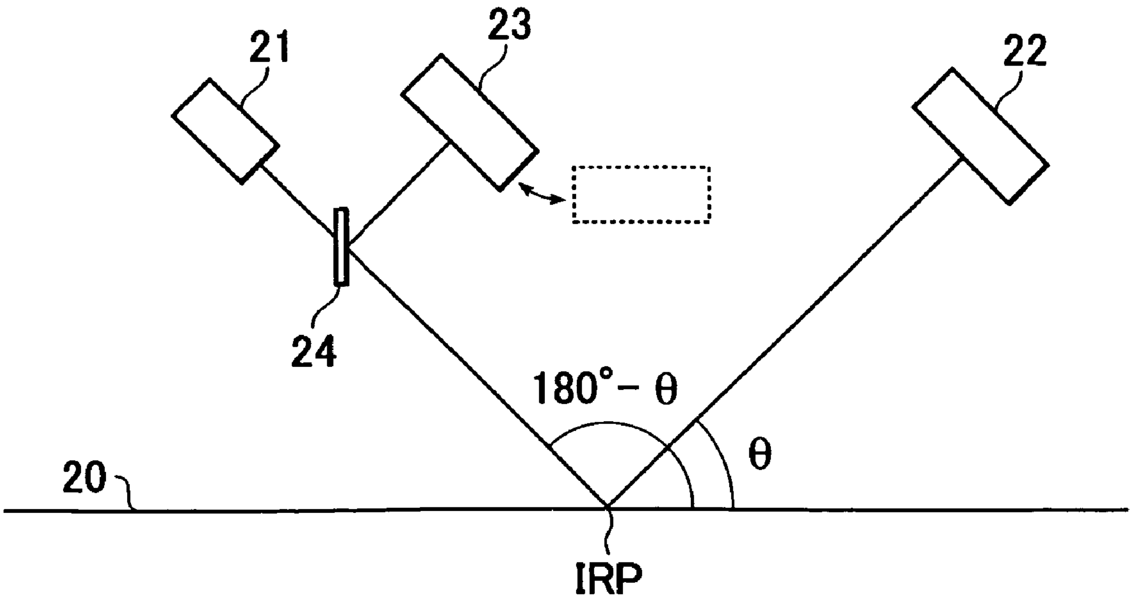
FIG. 3 schematically shows the arrangement of elements of a recording-medium identification device according to a second embodiment of the present invention.

A second embodiment of the present invention will now be described with reference to FIG. 3. In the first embodiment, three light-receiving elements, that is, the specularly-reflected-light-receiving element 2, the coherent-backscattering-of-light-receiving element 3, and the diffusely-reflected-light-receiving element 5 are used. In this second embodiment, however, the coherent-backscattering-of-light-receiving element 3 and the diffusely-reflected-light receiving element 5 are provided as one light-receiving element.

A predetermined position on the surface of a recording medium 20 is determined to be an irradiation-reference position IRP. Then, a laser-light source 21 is provided in a predetermined position at a 180°-θ angle with respect to the irradiation-reference position (0°<θ<90°). A specularly-reflected-light-receiving element 22 is provided in a predetermined position at a θ angle with respect to the irradiation-reference position IRP. A half mirror 24 is provided on a predetermined position on an optical path between the laser-light source 21 and the irradiation-reference position IRP so as to reflect coherent backscattering of light from the irradiation-reference position IRP. Light emitted from the laser-light source 21 is made incident through the optical path. A light-receiving element 23 is provided in a predetermined position for receiving the coherent backscattering of light reflected by the half mirror 24 and other diffusely reflected light. These light-receiving elements (photo sensors) can be formed of various kinds of photo diodes such as a PIN-photo diode, an avalanche-photo diode, and so forth.

The light emitted from the laser-light source 21 reaches the recording medium 20 and is reflected and diffusely reflected according to the condition of the surface of the recording medium 20. In the case where a glossy recording medium such as an OHP sheet is used, a large amount of specularly reflected light can be observed while a small amount of diffusely reflected light is observed. However, in the case where a recording medium whose surface is coarse such as a sheet of plain paper is used, most of the light emitted from the laser-light source 21 is diffusely reflected and little of the light is specularly reflected. The diffusely reflected light and the reflected light are received by the specularly-reflected-light receiving element 22 and the coherent-backscattering-of-light-and-diffusely-reflected-light-receiving element 23, respectively. The coherent-backscattering-of-light-and-diffusely-reflected-light-receiving element 23 is installed in movable manner.

Figure 4A:
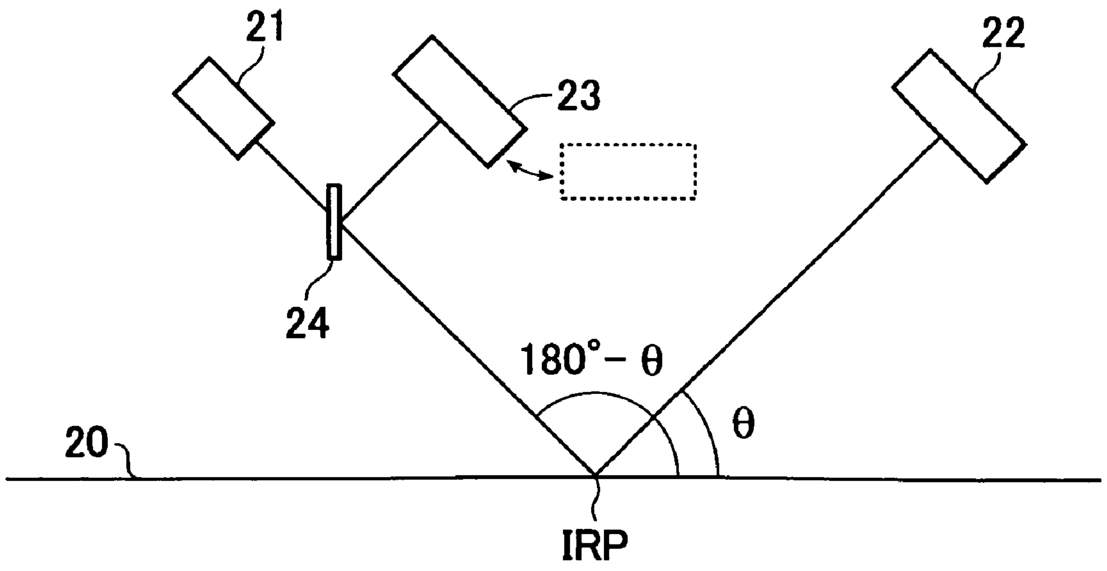
FIG. 4A is a schematic diagram according to the second embodiment for illustrating how coherent backscattering of light is received.
Figure 4B:
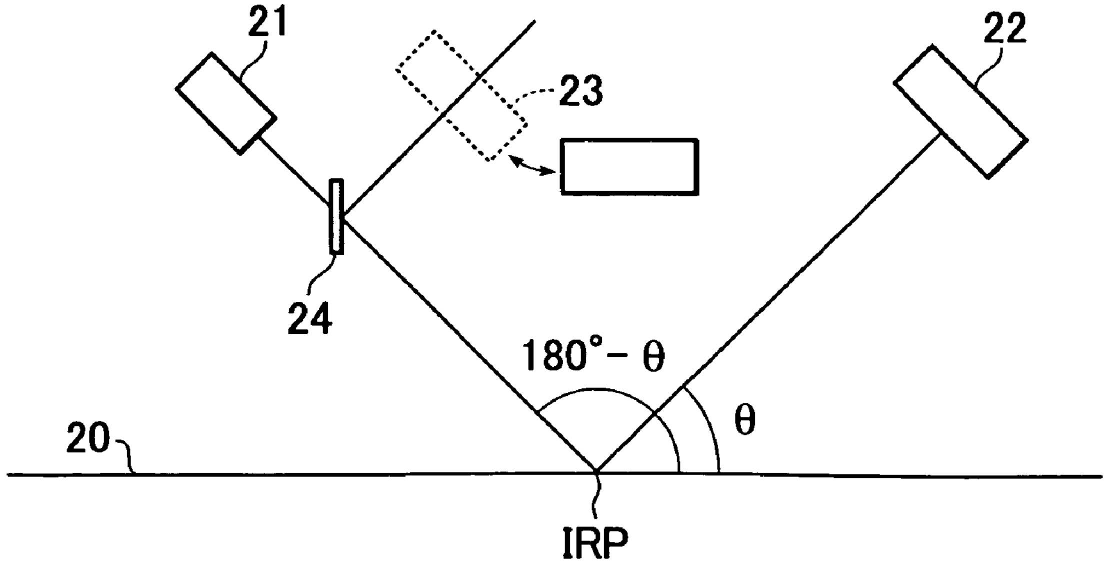
FIG. 4B is a schematic diagram according to the second embodiment for illustrating how diffusely reflected light is received.
Figure 5:
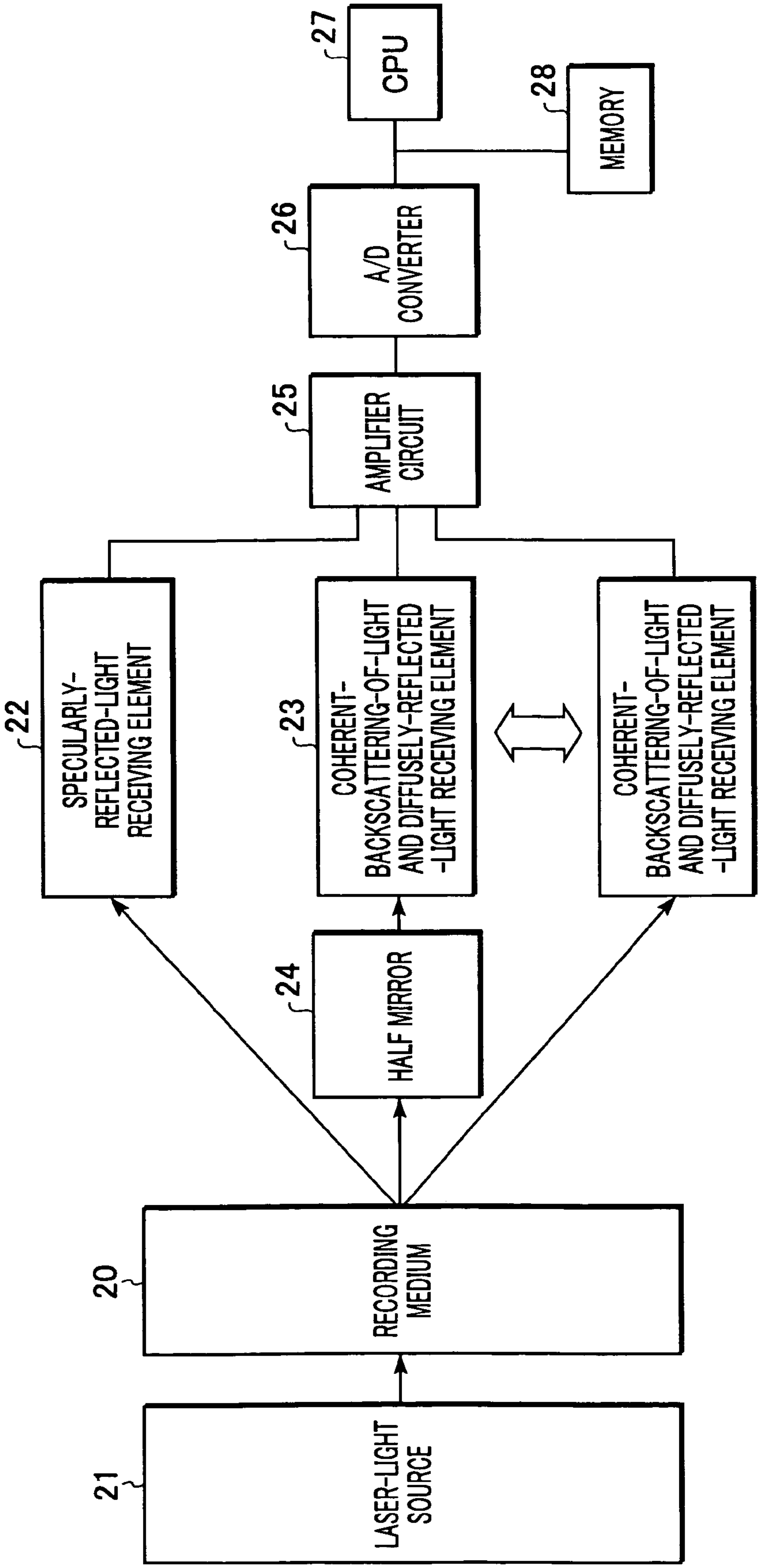
FIG. 5 is a block diagram illustrating how the elements of the recording-medium identification device according to the second embodiment are controlled.

FIGS. 4A and 4B show how the movable coherent-backscattering-of-light-and-diffusely-reflected-light-receiving element 23 receives coherent backscattering of light from the half mirror 24. As shown in FIG. 5, an output signal transmitted from the coherent-backscattering-of-light-and-diffusely-reflected-light-receiving element 23 is amplified by an amplifier circuit 25, digitized by an A/D converter 26, and stored in a memory 28. Then, the coherent-backscattering-of-light-and-diffusely-reflected-light-receiving element 23 rotates so that the light-receiving surface thereof faces the irradiation-reference position on the recording medium 20, as shown in FIG. 4B. In this case, the coherent-backscattering-of-light-and-diffusely-reflected-light-receiving element 23 functions as a diffusely-reflected-light-receiving element and transmits an output for received diffusely reflected light.

The coherent-backscattering-of-light-and-diffusely-reflected-light-receiving element 23 is movable by using a motor or the like. When functioning as a coherent-backscattering-of-light-receiving element, the coherent-backscattering-of-light-and-diffusely-reflected-light-receiving element 23 must receive light reflected by the half mirror 24 with reliability higher than that in the case where the coherent-backscattering-of-light-and-diffusely-reflected-light-receiving element 23 functions as a diffusely-reflected-light-receiving element. Therefore, the reference position on which the coherent-backscattering-of-light-and-diffusely-reflected-light-receiving element 23 is installed as shown by the solid line in FIG. 4A.

The memory 28 stores an output signal transmitted from the specularly-reflected-light-receiving element 22, the above-described two output signals transmitted from the coherent-backscattering-of-light-and-diffusely-reflected-light-receiving element 23, and a determination program. Therefore, a CPU 27 can identify the type of recording medium by using these three output signals from the three light-receiving elements by using the determination program, the program being used for comparing output signals that had already been obtained for various types of recording mediums to the output signals transmitted from the light-receiving elements.

Figure 6:
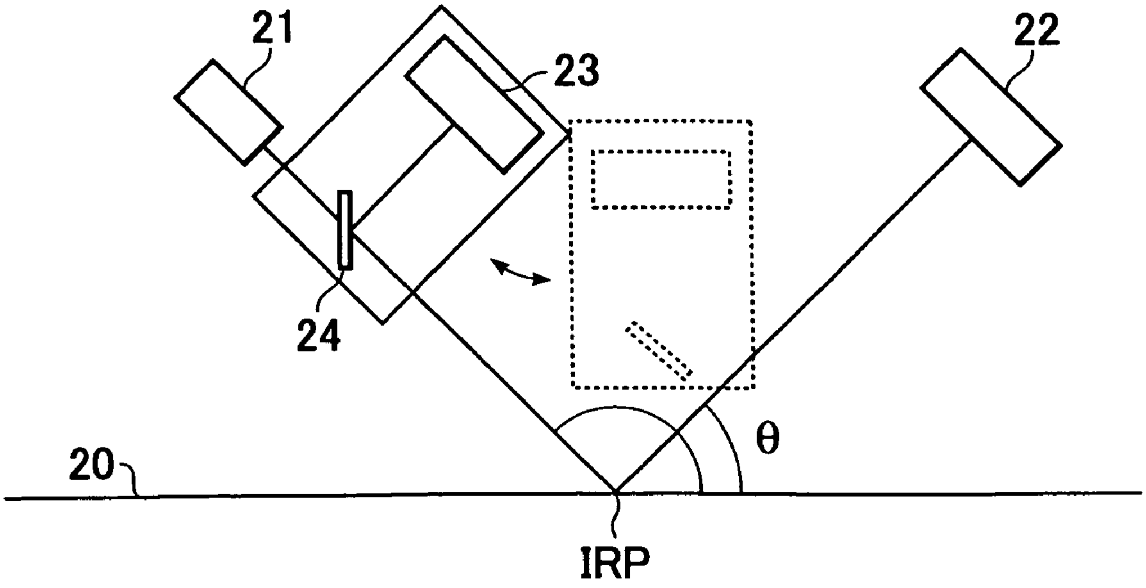
FIG. 6 is a schematic diagram according to the second embodiment, wherein a coherent-backscattering-of-light-and-diffusely-reflected-light-receiving element and a half mirror are integrated to each other.

Further, as shown in FIG. 6, the half mirror 24 and the coherent-backscattering-of-light-and-diffusely-reflected-light-receiving element 23 may be combined together so that they can be operated at the same time.

Figure 7A:
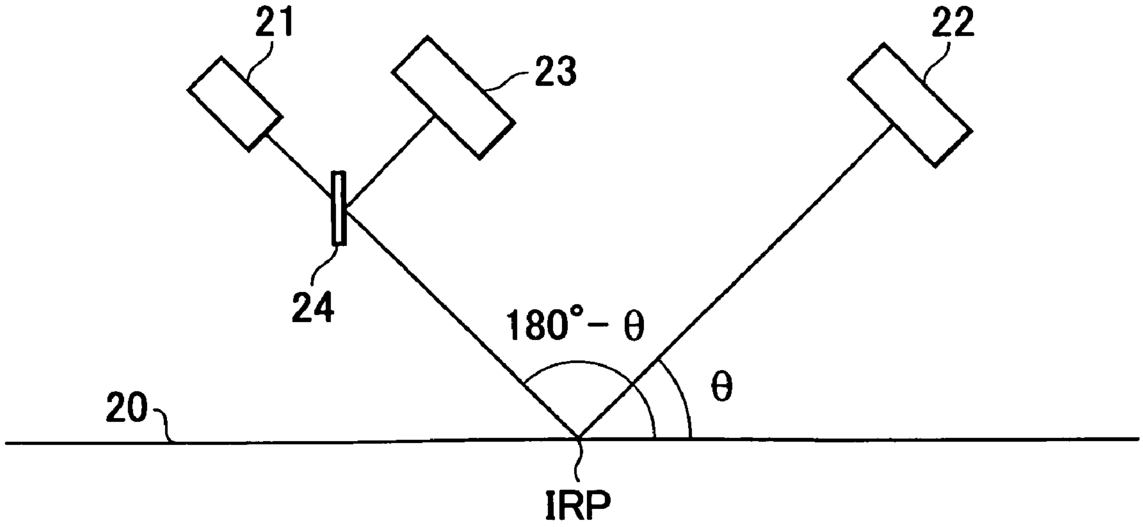
FIG. 7A is a schematic diagram according to the second embodiment, wherein a laser-light-emitting element is installed in movable manner.
Figure 7B:
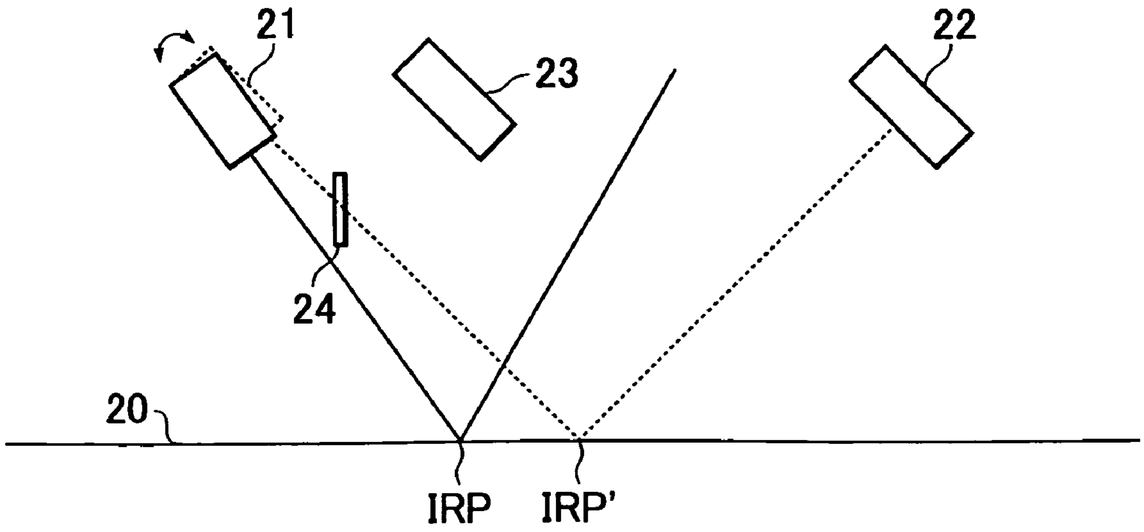
FIG. 7B is another schematic diagram of the second embodiment, wherein the laser-light-emitting element is installed in the movable manner.

Further, the laser-light source 21 may be movable. In this case, specularly reflected light and coherent backscattering of light are received by the specularly-reflected-light-receiving element 22 and the coherent-backscattering-of-light-and-diffusely-reflected-light receiving element 23, respectively, as shown in FIG. 7A. Then, the data on the specularly reflected light and the coherent backscattering of light is stored in the memory 28. After that, the laser-light source 21 moves and the irradiation-reference position IRP on the recording medium 20 changes to IRP', as shown in FIG. 7B. In this case, the coherent-backscattering-of-light-and-diffusely-reflected-light-receiving element 23 functions as the diffusely-reflected-light-receiving element. Therefore, the CPU 27 can identify the types of recording mediums according to the above-described three types of output signals.

According to the second embodiment, three types of light can be determined by using two light-receiving elements.

Third Embodiment

A recording-medium identification device according to a third embodiment of the present invention will now be described. In the first embodiment, the laser-light source 1 and the three light-receiving elements, that is, the specularly-reflected-light-receiving element 2, the coherent-backscattering-of-light-receiving element 3, and the diffusely-reflected-light-receiving element 5, are used. However, the recording-medium identification device of this third embodiment has only one laser-light source and only one light-receiving element. Since the laser-light source and the light-receiving element are movable, the light-receiving element can function as the above-described three types of light-receiving elements.

Figure 8A:
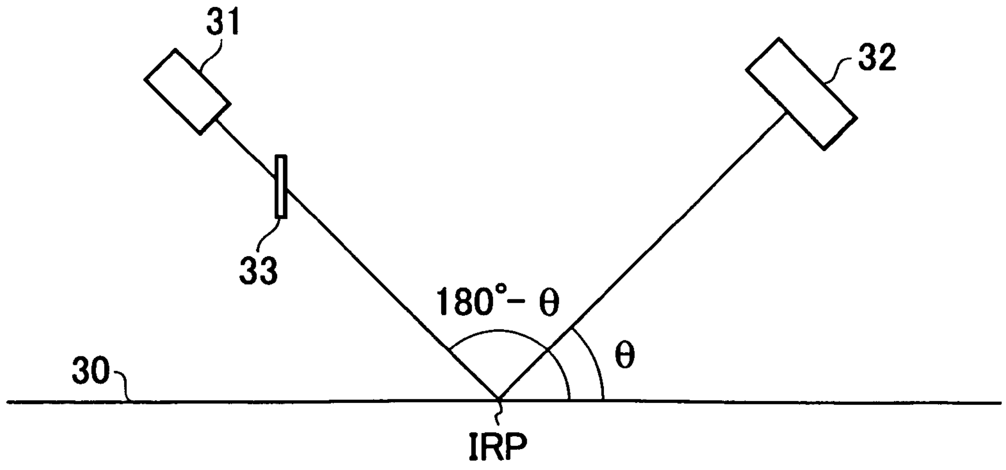
FIG. 8A is a schematic diagram according to a third embodiment of the present invention, wherein a light-receiving element is installed in movable manner.
Figure 8B:
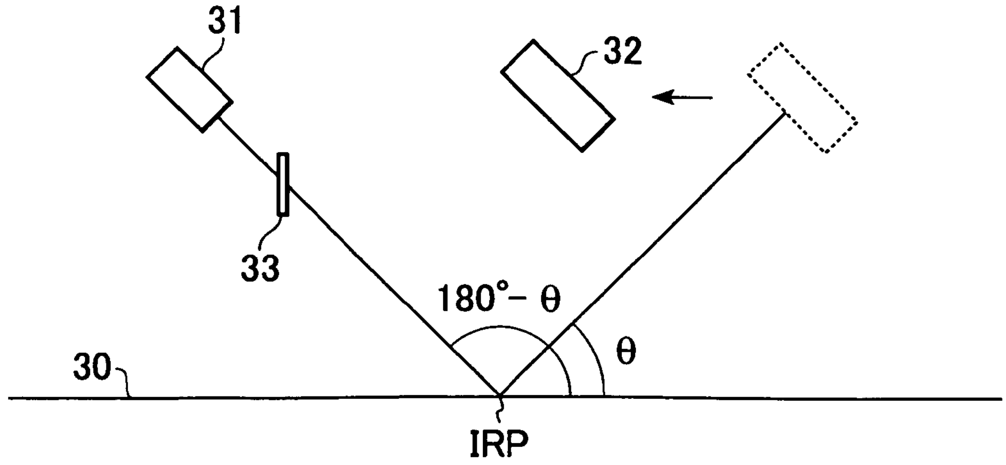
FIG. 8B is another schematic diagram according to the third embodiment of the present invention, wherein the light-receiving element is installed in movable manner.
Figure 8C:
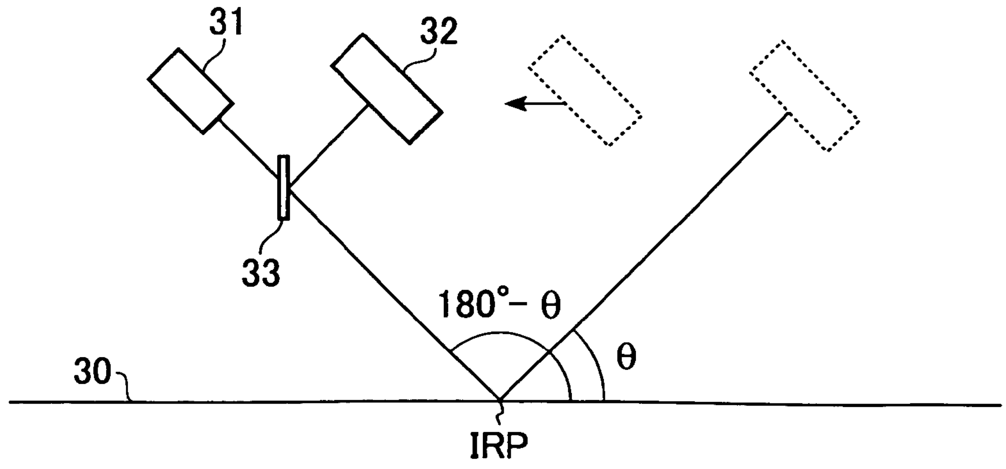
FIG. 8C is another schematic diagram according to the third embodiment of the present invention, wherein the light-receiving element is installed in movable manner.

A predetermined position on the surface of a recording medium 30 is determined to be an irradiation-reference position. Then, a laser-light source 31 is provided in a predetermined position at a 180°-θ angle with respect to the irradiation-reference position IRP (0°<θ<90°). A specularly-reflected-light-receiving element 32 is provided in a predetermined position at a θ angle with respect to the irradiation-reference position IRP. A half mirror 33 is provided on a predetermined position on an optical path between the laser-light source 31 and the irradiation-reference position IRP so as to reflect coherent backscattering of light from the irradiation-reference position IRP. Incidentally, light emitted from the laser-light source 31 is made incident through the optical path. Light emitted from the laser-light source 31 for measuring specularly reflected light is reflected specularly at the irradiation-reference position IRP on the recording medium 30 and received by the specularly-reflected-light-receiving element 32. Then, the specularly-reflected-light-receiving element 32 is moved to a position where it functions as a diffusely-reflected-light-receiving element, as shown in FIG. 8B. After data on the specularly reflected light and diffusely reflected light is stored in memory, the diffusely-reflected-light-receiving element 32 is moved to a position where it functions as the coherent-backscattering-of-light-receiving element. Therefore, a program for comparing output signals that had already been obtained for various types of recording mediums to the output signals transmitted from the light-receiving element may be run by a CPU to identify the types of recording mediums by analyzing these three output signals. This light-receiving element (a photo sensor) can be formed of various kinds of photo diodes such as the PIN-photo diode, the avalanche-photo diode, and so forth. Since the intensity of specularly reflected light and that of diffusely reflected light are different from each other, the output signals thereof are adjusted by using an amplifier circuit or the like.

The light receiving element 32 can be moved by using a motor or the like. When functioning as a coherent-backscattering-of-light-receiving element, the light-receiving element 32 must receive light reflected by the half mirror 33 with reliability higher than that in the case where the light-receiving element 32 functions as the diffusely-reflected-light-receiving element, or as the specularly-reflected-light-receiving element. Therefore, the reference position on which the light-receiving element 32 is installed may preferably be determined to be the position on which the coherent-backscattering-of-light-receiving element is installed.

Figure 9:
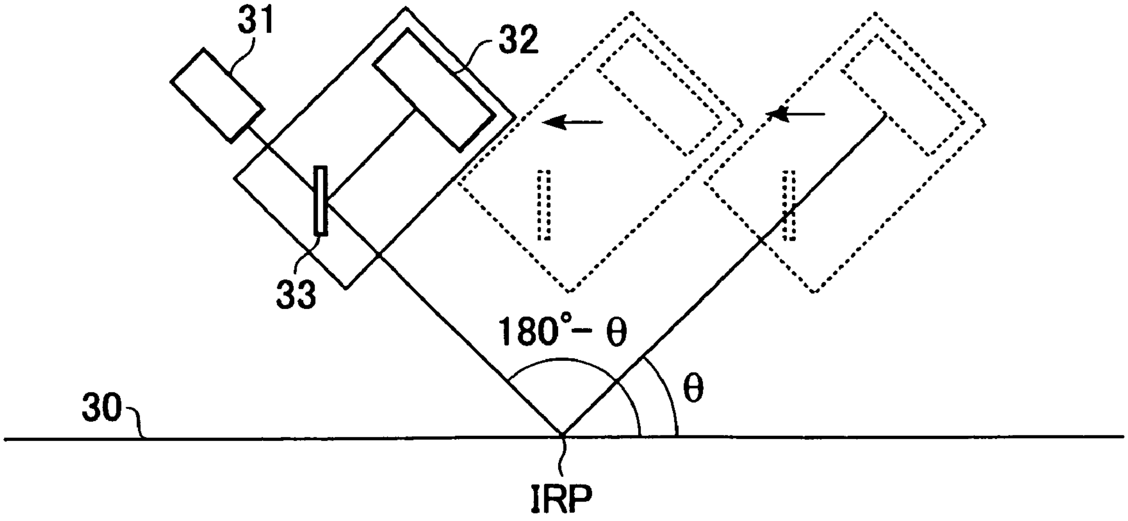
FIG. 9 is a schematic diagram according to the third embodiment, wherein the receiving element and the half mirror are integrated to each other and installed in movable manner.

Further, the half mirror 33 and the light-receiving element 32 may be combined together, as shown in FIG. 9, so that they can be moved at the same time.

Figure 10A:
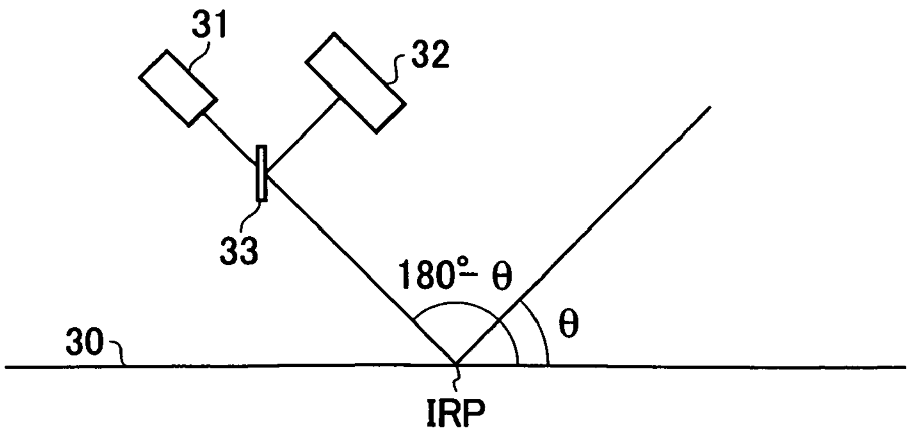
FIG. 10A is a schematic diagram according to the third embodiment, wherein the laser-light-emitting element is installed in movable manner.
Figure 10B:
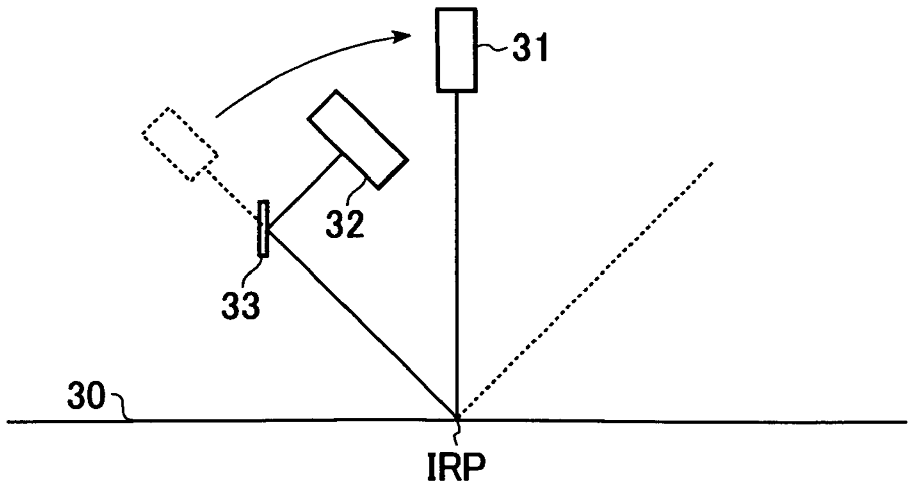
FIG. 10B is another schematic diagram according to the third embodiment, wherein the laser-light-emitting element is installed in movable manner.
Figure 10C:
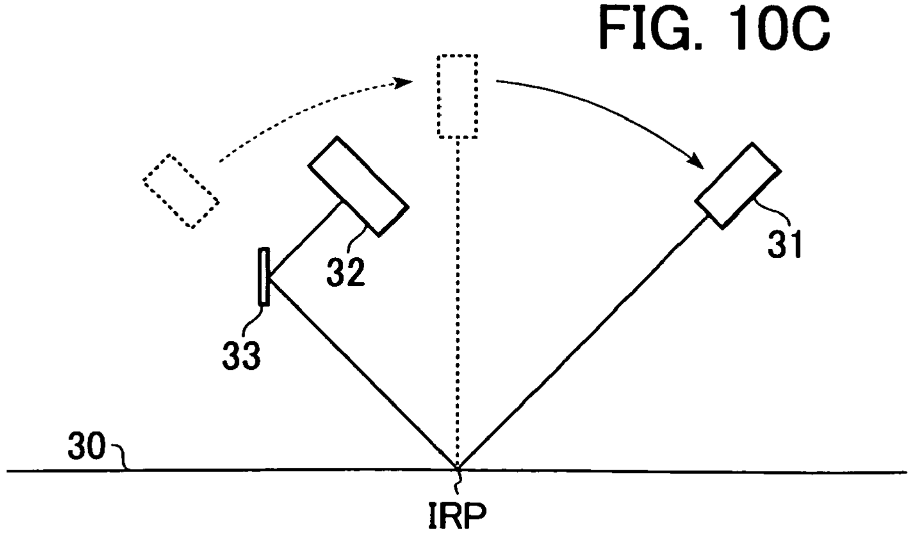
FIG. 10C is another schematic diagram according to the third embodiment, wherein the laser-light-emitting element is installed in movable manner.

Instead of installing a movable light-receiving element 32, the laser-light source 31 is movable. In this case, the laser-light source 31 emits light from a position suitable for measuring coherent backscattering of light, as shown in FIG. 10A. This coherent backscattering of light is reflected by the half mirror 33 and received by the light-receiving element 32. An output signal transmitted from the light-receiving element 32 is stored in the memory, as digital data, via an amplifier circuit and an A/D converter. Then, the laser-light source 31 is moved to a predetermined position where the light-receiving element 32 functions as a diffusely-reflected-light-receiving element, as shown in FIG. 10B. An output signal transmitted from the light-receiving element 32 while at the diffusely-reflected-light-receiving position is also stored in the memory in the above-described manner. After that, the laser-light source 31 is moved to a predetermined position where the light-receiving element 32 functions as the specularly-reflected-light-receiving element, as shown in FIG. 10C. An output signal transmitted from the light-receiving element 32 while at the specularly-reflected-light-receiving position is also stored in the memory in the above-described manner. Therefore, a CPU can identify the types of recording mediums by using these three output signals from the light-receiving element 32 by using a determination program for comparing output signals that had already been obtained for various types of recording mediums to the output signals transmitted from the light-receiving element 32.

According to the third embodiment, three types of light reflection can be measured by using one light-receiving element.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims.

What is claimed is:

1. A recording-medium identification device for identifying a recording medium type, the recording-medium identification device comprising:

light-emitting means for emitting light onto a surface of the recording medium, said light emitting means emitting light on the surface in a predetermined direction other than a direction perpendicular to the surface of the recording medium, the recording medium diffusely reflecting the light;

detection means for detecting an amount of light reflected off the surface of the recording medium; and identification means for identifying the type of the recording medium based on the amount of light detected by said detection means, wherein said detection means comprises first detection means for detecting an amount of diffusely reflected light reflected in a direction opposite to the predetermined direction of the light reflected off the surface of the recording medium.

2. A recording-medium identification device according to claim 1, wherein said detection means further comprises second detection means for detecting an amount of specularly reflected light of the light reflected off the surface of the recording medium.

3. A recording-medium identification device according to claim 1, wherein said detection means further comprises third detection means for detecting an amount of the diffusely reflected light is reflected at a predetermined angle other than the angle at which the light emitted by the light emitting means is made incident.

4. A recording-medium identification device according to claim 1, wherein the light emitting means is a laser light.

5. A recording-medium identification device according to claim 1, wherein said detection means includes a semiconductor light receiving element for detecting the amount of received light reflected off the surface of the recording medium.

6. A recording-medium identification device according to claim 1, further comprising a reflector positioned between said light emitting means and the recording medium to reflect the diffusely reflected light reflected off the recording medium to the first detection means.

7. A recording-medium identification device according to claim 6, wherein said reflector is a half mirror.

8. A recording-medium identification device for identifying a recording medium type, the recording medium identification device comprising:

a light emitting unit for reflecting light off a surface of the recording medium, said light emitting unit positioned to direct light onto the surface of the recording medium in a predetermined direction other than a direction normal to the surface of the recording medium;

a specularly-reflected-light receiving element provided at a predetermined position so as to receive specularly reflected light at a predetermined angle the same as that at which the light emitted from the light emitting unit was made incident;

a half mirror positioned between the light emitting unit and the recording medium to reflect light in a direction generally perpendicular to the direction of the light emitted from the light emitting unit;

a coherent-backscattering-of-light receiving element for receiving light reflected from said half mirror; and identification means for identifying the type of recording medium based on the amount of light detected by said specularly-reflected-light receiving element and said coherent-backscattering-of-light receiving element.

9. A recording-medium identification device according to claim 8, wherein said half mirror and said coherent-backscattering-of-light receiving element are combined and movable in unison.

10. A recording-medium identification device according to claim 8, wherein said light emitting unit is movable.

11. A recording-medium identification device according to claim 8, further comprising a diffusely-reflected-light receiving element provided at a position so as to receive diffusely reflected light reflected at a predetermined angle other than the angle at which the light emitted from the light emitting unit is made incident, wherein said identification means also bases the identification of the type of recording medium on an amount of light detected by said diffusely-reflected-light receiving element.

12. A recording-medium identification device for identifying a recording medium type, the recording medium identification device comprising:

a light emitting unit for reflecting light off a surface of the recording medium, said light emitting unit positioned to direct light onto the surface of the recording medium in a predetermined direction other than a direction normal to the surface of the recording medium;

a specularly-reflected-light receiving element provided at a predetermined position so as to receive specularly reflected light at a predetermined angle the same as that at which the light emitted from the light emitting unit was made incident;

a half mirror positioned between the light emitting unit and the recording medium to reflect light in a direction generally perpendicular to the direction of the light emitted from the light emitting unit;

a movable coherent-backscattering-of- light receiving element for receiving light reflected from said half mirror, wherein said coherent-backscattering-of-light receiving element is movable between a position where it receives light reflected from said half mirror and a position where it receives diffusely reflected light reflected at a predetermined angle other than the angle at which light emitted from the light emitting unit is made incident; and identification means for identifying the type of recording medium based on an amount of light detected by said specularly-reflected-light receiving element and an amount of light detected by said coherent-backscattering-of-light receiving element at the end of the two positions.

13. A recording-medium identification device for identifying a recording medium type, the recording-medium identification device comprising:

a light emitting unit for reflecting light off a surface of the recording medium, said light emitting unit applying light on the surface in a predetermined direction other than a direction normal to the surface of the recording medium;

a half-mirror positioned between said light emitting unit and the recording medium to reflect light in a direction generally perpendicular to the direction of the light emitted from the light emitting unit;

a single light receiving element, said light receiving element movable between a first position where said light receiving element receives specularly reflected light reflected off the recording medium, a second position where said light receiving element receives diffusely reflected light reflected off the recording medium and a third position where said light receiving element receives coherent backscattering of light reflected off said half mirror; and identification means for identifying the type of recording medium based on respective outputs of an amount of light detected by said light receiving element at the first position, the second position and the third position.

14. A recording-medium identification method for identifying a recording medium type using a recording-medium identification device comprising a light emitting unit for reflecting light onto a surface of the recording medium, said light-emitting unit applying light onto the surface in a predetermined direction other than a direction perpendicular to the surface, the recording medium diffusely reflecting the light, the recording medium identification method comprising the steps of:

detecting an amount of light reflected off the surface of the recording medium; and identifying the type of the recording medium based on the amount of light detected in the step of detecting an amount of light, wherein the step of detecting comprises first detecting step of detecting diffusely reflected light reflected in a direction opposite to the predetermined direction from the light reflected off the surface of the recording medium.

15. A recording-medium identification method as claim 14, the step of detecting further comprising a second step of detecting an amount of specularly reflected light of the light reflected off the surface of the recording medium.

16. A recording-medium identification method as claim 14, the step of detecting further comprises the third detection step of detecting an amount of light diffusely reflected off the surface of the recording medium at a predetermined angle other than the angle at which the light emitted by the light emitting unit is made incident.

* * * * *

UNITED STATES PATENT AND TRADEMARK OFFICE

CERTIFICATE OF CORRECTION

PATENT NO. : 7,313,067 B2
APPLICATION NO. : 10/693890
DATED : December 25, 2007
INVENTOR(S) : Higashiyama It is certified that error appears in the above-identified patent and that said Letters Patent is hereby corrected as shown below:

COLUMN 2:
Line 9, “is” (second occurrence) should be deleted.

COLUMN 6:
Line 60, “element” should read --element 3--.

COLUMN 11:
Line 66, “on” should read --in--.

COLUMN 13:
Line 42, “is” should be deleted.

COLUMN 14:
Line 32, “recording medium” should read --recording-medium--.

COLUMN 15:
Line 16, “half mirror;” should read --half-mirror;--.

COLUMN 16:
Line 9, “first” should read --a first--.
Line 14, “as claim” should read --as in claim--.
Line 15, “second step” should read --section detection step--.
Line 18, “as claim” should read --as in claim--.
Line 19, “comprises the” should read --comprising a--.

Signed and Sealed this

Twenty-second Day of July, 2008

Jon W. Dudas

JON W. DUDAS
*Director of the United States Patent and Trademark Office*